US007998891B2

(12) United States Patent
Fu

(10) Patent No.: US 7,998,891 B2
(45) Date of Patent: Aug. 16, 2011

(54) OPTICAL GLASS CONTAINING BISMUTH OXIDE

(75) Inventor: Jie Fu, Kanagawa (JP)

(73) Assignee: Ohara Inc., Sagamihara-shi, Kanagawa (JP)

( * ) Notice: Subject to any disclaimer, the term of this patent is extended or adjusted under 35 U.S.C. 154(b) by 596 days.

(21) Appl. No.: 11/918,714

(22) PCT Filed: Apr. 27, 2006

(86) PCT No.: PCT/JP2006/309210

§ 371 (c)(1), (2), (4) Date: Oct. 18, 2007

(87) PCT Pub. No.: WO2006/118326

PCT Pub. Date: Nov. 9, 2006

(65) Prior Publication Data

US 2009/0069166 A1 Mar. 12, 2009

(30) Foreign Application Priority Data

Apr. 28, 2005 (JP) ................................ 2005-133070

(51) Int. Cl.
*C03C 3/14* (2006.01)
*C03C 3/15* (2006.01)
*C03C 3/062* (2006.01)
*C03C 3/064* (2006.01)
*C03C 3/068* (2006.01)

(52) U.S. Cl. ................ 501/49; 501/50; 501/51; 501/52; 501/73; 501/77; 501/78; 501/79

(58) Field of Classification Search .................... 501/49, 501/50, 51, 52, 73, 77, 78, 79
See application file for complete search history.

(56) References Cited

U.S. PATENT DOCUMENTS

| | | | | |
|---|---|---|---|---|
| 6,599,852 | B2 * | 7/2003 | Kondo et al. | 501/42 |
| 6,599,853 | B2 * | 7/2003 | Sugimoto et al. | 501/50 |
| 6,620,748 | B1 * | 9/2003 | Sugimoto et al. | 501/64 |
| 6,624,104 | B2 * | 9/2003 | Sakoske et al. | 501/73 |
| 7,098,158 | B2 * | 8/2006 | Natsugari et al. | 501/78 |
| 7,341,965 | B2 * | 3/2008 | Schreder et al. | 501/37 |
| 7,524,781 | B2 * | 4/2009 | Nagashima et al. | 501/50 |
| 2003/0064878 | A1 * | 4/2003 | Sugimoto et al. | 501/73 |
| 2003/0191006 | A1 * | 10/2003 | Natsugari et al. | 501/49 |
| 2004/0220040 | A1 | 11/2004 | Uehara | |
| 2004/0254057 | A1 | 12/2004 | Schreder et al. | |
| 2005/0032621 | A1 * | 2/2005 | Zou et al. | 501/46 |
| 2005/0037913 | A1 | 2/2005 | Peuchert et al. | |
| 2005/0192174 | A1 * | 9/2005 | Yamamoto et al. | 501/45 |
| 2006/0063660 | A1 | 3/2006 | Schreder et al. | |

FOREIGN PATENT DOCUMENTS

| | | |
|---|---|---|
| DE | 10207583 A1 | 9/2003 |
| EP | 1493720 A1 | 1/2005 |
| JP | 01-308843 | 12/1989 |
| JP | 08-157231 | 6/1996 |
| JP | 08-217484 | 8/1996 |
| JP | 08-225339 | 9/1996 |
| JP | 2002-201039 | 7/2002 |
| JP | 2003-300751 | 10/2003 |
| JP | 2003-321245 | 11/2003 |
| JP | 2004-189419 | 7/2004 |
| JP | 2004-292301 | 10/2004 |
| JP | 2004294464 A * | 10/2004 |
| JP | 2005-154253 | 6/2005 |
| JP | 2005-239476 | 9/2005 |
| JP | 2006-151758 | 6/2006 |
| JP | 2008-266140 | 11/2008 |
| TW | 200418739 | 10/2004 |
| WO | 2004/074197 | 9/2004 |
| WO | WO 2004113244 A1 * | 12/2004 |

OTHER PUBLICATIONS

Notice of Reasons for Rejection for Japanese Patent Application No. 2008-194201 dated Jan. 26, 2009.

Notice of Reasons for Rejection 2009-092431 dated May 11, 2009.

Decision to Grant a Patent 2009-092430 dated May 11, 2009.

Deparis et al., "Origin and Enhancement of the Second-Order Non-Linear Optical Susceptibility Induced in Bismuth Borate Glasses by Thermal Policy", Journal of Non-Crystalline Solids, North-Holland Physics Publishing, vol. 351, No. 27-29, Aug. 15, 2005, pp. 2166-2177.

Taiwan Notice of Allowance w/ Search Report 098123834 mailed Sep. 2, 2009.

Notice of Reasons for Rejection translation of Japanese Office Action.

Dumbaugh, W.H., "*Heavy Metal Oxide Glasses Containing $Bi_2O_3$*", Physics and Chemistry of Glasses, vol. 27, No. 3, Jun. 1986, pp. 119-123.

Ford, N. et al., "*Optical and Physical Properties of Glasses in the Systems $GeO_2$-$Bi_2O_3$ -PbO and $TeO_2$-$Bi_{2\ O3}$-$WO_3$*", Glass Technology, vol. 28, No. 2, Apr. 1987, pp. 106-113.

Lapp, Josef C., "*Glasses*", American Ceramic Society, vol. 71, No. 10, Oct. 1992, pp. 1543-1552.

Huang, Wen-Hai et al., "*Color and Selected Properties of PbO-$BiO_{1.5}$-$GaO_{1.5}$ Glasses*" American Ceramic Society, vol. 77, No. 4, Oct. 1994, pp. 1017-1024.

German Office Action, German Patent Application No. 11 2006 001 070.0-45, Date: Nov. 18, 2010, pp. 1-3, English Translation: pp. 1-2.

* cited by examiner

*Primary Examiner* — Karl Group
*Assistant Examiner* — Elizabeth A Bolden
(74) *Attorney, Agent, or Firm* — Hoffmann & Baron, LLP

(57) ABSTRACT

Optical glass having a refractive index ($n_d$) of 1.85 or greater, and an Abbe number ($\nu_d$) falling within the range of 10 to 30, which is suited for molding by precision mold press is provided. The optical glass is characterized by including $B_2O_3$+$SiO_2$ in an amount of 3 to 60%, $Bi_2O_3$ in an amount of 25 to 80%, RO+$Rn_2O$ in an amount of 5 to 60% (wherein R represents one or more selected from a group consisting of Zn, Ba, Sr, Ca, and Mg; and Rn represents one or more selected from a group consisting of Li, Na, K, and Cs), with each component in the range expressed in oxide-based mole percentage, and is characterized in that transparency in the visible region is high, and that the transition point (Tg) is 480° C. or lower. The optical glass is characterized by having a spectral transmittance of 70% or greater at a wavelength of 600 nm for a thickness of 10 mm.

13 Claims, 1 Drawing Sheet

OPTICAL GLASS CONTAINING BISMUTH OXIDE

TECHNICAL FIELD

The present invention relates to an optical glass having high transparency in visible regions, and having optical constants such that the refractive index ($n_d$) is 1.85 or greater, and an Abbe number ($\nu_d$) is within a range of 10 to 30, so that the glass is suited for molding by precision mold press.

BACKGROUND ART

Conventionally, optical glass having a high refractive index, and with a high dispersion region are typically of a composition containing a large amount of lead oxide. Because of favorable glass stability and a low glass transition point (Tg), they have been used for precision mold press molding. For example, Patent Document 1 discloses an optical glass for a precision mold press which contains a large amount of lead oxide.

However, a reduction condition is maintained in order to prevent oxidation of the mold when molding by a precision mold press is performed. Therefore, when the glass component contains lead oxide, lead reduced from the glass surface break off and adheres to the mold surface. Accordingly, there have been problems in that the precision face of the mold is not maintained. Also, lead oxide is toxic to the environment so that glass free from lead oxide has been desired.

To meet such needs, many types of optical glass for press molding, having a high refractive index, with a high dispersion region, and not containing lead oxide, have been developed. However, most of those are of a phosphate-based system. For example, Patent Document 2 and Patent Document 3 disclose $P_2O_5$—$Nb_2O_5$—$WO_3$—($K_2O$, $Na_2O$, $Li_2O$) based glass, and Patent Document 4 discloses $P_2O_5$—$Nb_2O_5$—$TiO_2$—$Bi_2O_3$—$Na_2O$ based glass. However, many of these types of glass have a Tg of higher than 480° C., although such Tgs may be referred to as being low. Furthermore, a large amount of $Nb_2O_5$ must be introduced for achieving a high refractive index and high dispersion; therefore, there may be disadvantages in that devitrification resistance of the glass is not so high. Moreover, an optical glass having optical constants such that its refractive index is 1.95 or greater, and its dispersion is 20 or less has not been obtained from the phosphoric acid-based glass.

Furthermore, compositions including a large amount of $Bi_2O_3$ are well known for glasses with low Tg. For example, Nonpatent Documents 1, 2, 3, and 4 disclose $Bi_2O_3$—$Ga_2O_3$—PbO based glass, $Bi_2O_3$—$Ga_2O_3$-($Li_2O$, $K_2O$, $Cs_2O$) based glass, and $Bi_2O_3$—$GeO_2$ based glass. Although these types of glass have a Tg of 480° C. or lower, an absorption edge of the glass is more than 450 nm. Hence, transparency in the visible region may be drastically lost, and thus, these types of glass cannot be used as an optical lens required to have high transparency in the visible region.

[Patent Document 1] Japanese Patent Application Laid Open No. H1-308843

[Patent Document 2] Japanese Patent Application Laid Open No. 2003-321245

[Patent Document 3] Japanese Patent Application Laid Open No. H8-157231

[Patent Document 4] Japanese Patent Application Laid Open No. 2003-300751

[Nonpatent Document 1] Physics and Chemistry of Glasses, p 119, Vol. 27, No. 3, June 1986

[Nonpatent Document 2] Glass Technology, p 106, Vol. 28, No. 2, April 1987

[Nonpatent Document 3] American Ceramic Society Bulletin, p 1543, Vol. 71, No. 10, October 1992

[Nonpatent Document 4] American Ceramic Society, p 1017, Vol. 77, No. 4, October 1994

DISCLOSURE OF THE INVENTION

Problems to be Solved by the Invention

An object of the present invention is to provide a novel optical glass having a refractive index ($n_d$) of 1.85 or greater, an Abbe number ($\nu_d$) falling within the range of 10 to 30, and having high transparency in the visible region, and a glass transition point (Tg) of 480° C. or lower, which is suited for molding by a precision mold press.

Means for Solving the Problems

The present inventor carried out considerable research in order to solve the aforementioned problems, as a result of which he found that, through incorporating a large amount of $Bi_2O_3$ in a system that is completely different from the preexisting phosphoric acid salt system, transparency that is satisfactory for optical lenses in the visible region, high refractive index ($n_d$=1.85 or greater), and high Abbe number ($\nu_d$=10 to 30) could be achieved while keeping the glass transition point (Tg) of 480° C. or lower, and further found that these types of glass are extremely favorable for precision mold presses, resulting in the present invention.

More specifically, in a first aspect of the present invention, an optical glass includes $Bi_2O_3$ in an amount of 25 to 80% expressed in oxide-based mole percentage, and having a refractive index ($n_d$) of 1.85 or greater, and an Abbe number ($\nu_d$) of 10 to 30.

In a second aspect of the present invention, the optical glass according to the first aspect has a spectral transmittance of 70% or greater at a wavelength of 600 nm, for a thickness of 10 mm (optical path length: 10 mm).

In a third aspect of the present invention, the optical glass according to the first or second aspect has a transition point (Tg) of 480° C. or lower.

In a fourth aspect of the present invention, an optical glass includes $B_2O_3$+$SiO_2$ in an amount of 3 to 60%, and/or $Bi_2O_3$ in an amount of 25 to 80%, and/or RO+$Rn_2O$ in an amount of 5 to 60% (wherein R represents one or more selected from a group consisting of Zn, Ba, Sr, Ca, and Mg; and Rn represents one or more selected from a group consisting of Li, Na, K, and Cs), and/or $Sb_2O_3$+$As_2O_3$ in an amount of 0 to 5%, with each component in the range expressed in oxide-based mole percentage, wherein the wavelength at which the spectral transmittance of 70% is exhibited is 550 nm or less; the refractive index ($n_d$) is 1.85 or greater; and the Abbe number ($\nu_d$) is 10 to 30.

In a fifth aspect of the present invention, the optical glass according to any one of the first to fourth aspects has a part or all of $B_2O_3$, and/or $SiO_2$ substituted with $GeO_2$.

In a sixth aspect of the present invention, the optical glass according to any one of the first to fifth aspects includes one or two of $Al_2O_3$, and/or $Ga_2O_3$ components in an amount of 0 to 20% expressed in oxide-based mole percentage.

In a seventh aspect of the present invention, the optical glass according to any one of the first to sixth aspects includes $P_2O_5$ in an amount of 0 to 8% expressed in oxide-based mole percentage.

In an eighth aspect of the present invention, the optical glass according to any one of the first to seventh aspects includes $TiO_2$ in an amount of 0 to 20% expressed in oxide-based mole percentage.

In a ninth aspect of the present invention, the optical glass according to any one of the first to eighth aspects includes one or more of $La_2O_3$, and/or $Y_2O_3$, and/or $Gd_2O_3$ components in an amount of 0 to 15% expressed in oxide-based mole percentage.

In a tenth aspect of the present invention, the optical glass according to any one of the first to ninth aspects includes one or more of $ZrO_2$, and/or $SnO_2$, and/or $Nb_2O_5$, and/or $Ta_2O_5$, and/or $WO_3$ components in an amount of 0 to 10% expressed in mol % based on oxide.

In an eleventh aspect of the present invention, the optical glass according to any one of the first to tenth aspects has an absorption edge of 450 nm or lower.

In a twelfth aspect of the present invention, the optical glass according to any one of the first to eleventh aspects has a $B_2O_3/SiO_2$ value (mol % ratio), expressed in oxide-based mole percentage, is 0.2 to 5.

In a thirteenth aspect of the present invention, the optical glass according to any one of the first to twelfth aspects has a total content of $Li_2O$, $Na_2O$, and $K_2O$ exceeding 8% expressed in oxide-based mole percentage.

In a fourteenth aspect of the present invention, the optical glass according to any one of the first to thirteenth aspects has a total content of $La_2O_3$, $ZrO_2$, $TiO_2$, SrO, $Na_2O$, and $Li_2O$ exceeding 10% expressed in oxide-based mole percentage.

In a fifteenth aspect of the present invention, the optical glass according to any one of the first to fourteenth aspects is for precision molding.

In a sixteenth aspect of the present invention, an optical element is obtained by molding the glass for precision molding according to the fifteenth aspect.

Effects of the Invention

The optical glass of the present invention includes $Bi_2O_3$ in a large amount as a glass component; therefore, transparency which is satisfactory for optical lenses in the visible region, a high refractive index ($n_d$=1.85 or greater) and a low Abbe number ($\nu_d$=10 to 30) can be achieved while keeping the glass transition point (Tg) at 480° C. or lower. Accordingly, an optical glass suited for molding by a precision mold press can be provided.

PREFERRED MODE FOR CARRYING OUT THE INVENTION

Figure 1:
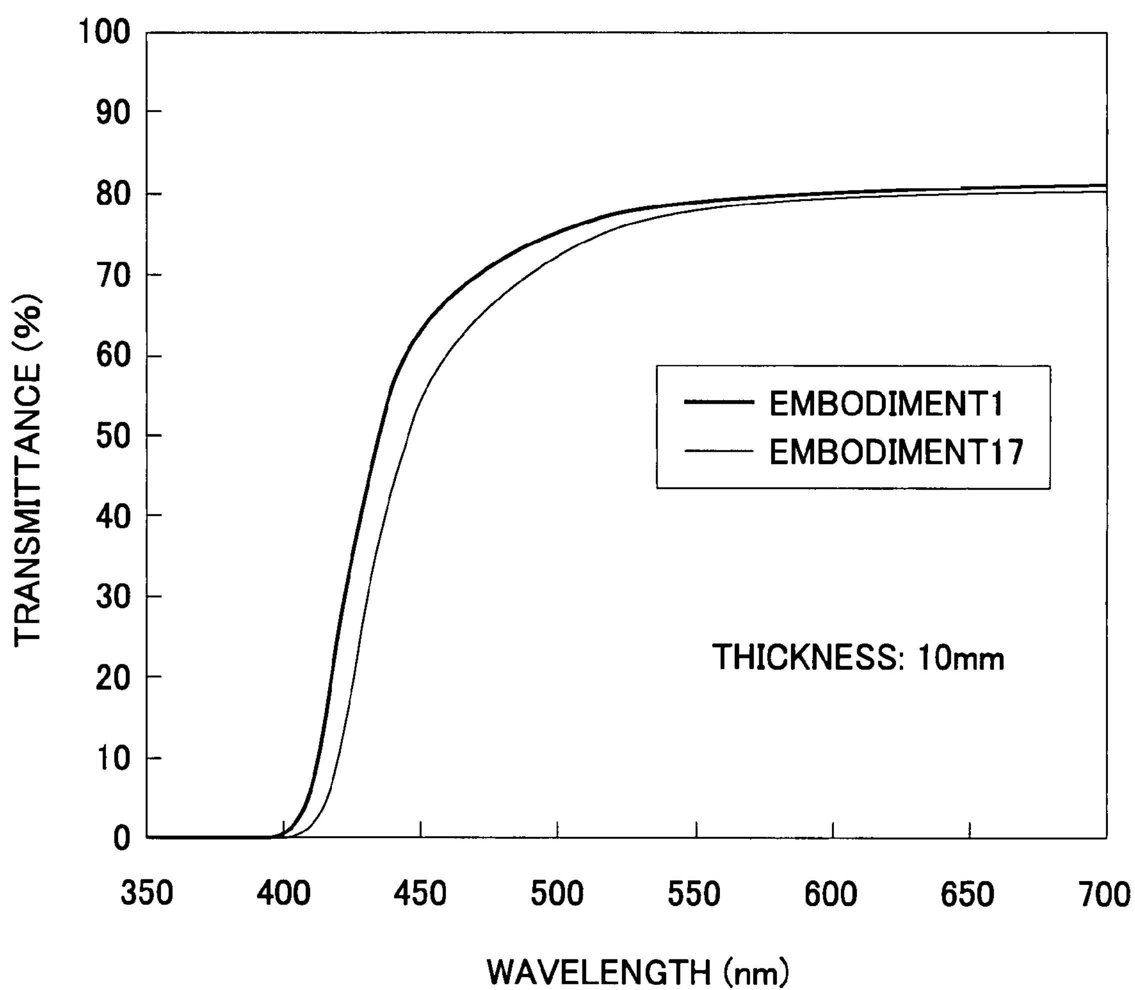
FIG. 1 shows a spectral transmittance curve for the glass of Embodiments 1 and 17. The abscissa represents the wavelength (nm), and the ordinate represents the spectral transmittance (%).

Grounds for defining the composition range of each component that constitutes the optical glass of the present invention as described above will be described below. Each component is expressed in oxide-based mole percentage.

$B_2O_3$ and $SiO_2$ components are oxides for forming glass, either of which is essential for obtaining stable glass. In order to obtain stable glass, the lower total content limit of one or two of these components is preferably 3%, more preferably 5%, and most preferably 10%. However, for attaining a refractive index of 1.85 or greater and a Tg of 480° C. or lower, the upper content limit is preferably 60%, more preferably 55%, and most preferably 50%. The object of the present invention can be achieved even if these two components are introduced into the glass alone; however, concurrent use is preferred because melting properties, stability and chemical durability of the glass may be enhanced, accompanied by improvement of transparency in the visible region, when they are used concurrently. Additionally, in order to maximize the aforementioned effect, mole percentage ratio of $B_2O_3/SiO_2$ desirably falls within the range of 0.2 to 5.

The $GeO_2$ component is effective in improving the stability and refractive index of the glass, and further, is responsible for high dispersion; therefore, it is an optional component which can be introduced into the glass to substitute for a part or all of $B_2O_3$ or $SiO_2$. However, due to its expensiveness, the upper content limit is preferably 50%, more preferably 45%, and most preferably 35% in order to keeping the Tg at 480° C. or lower.

The $Bi_2O_3$ component contributes greatly towards improving the stability of the glass, and is necessary for achieving the object of the present invention which is, in particular, to attain a refractive index ($n_d$) of 1.85 or greater and a Tg of 480° C. or lower. Because the refractive index and the dispersion in the present invention are strongly dependent on the content of $Bi_2O_3$, a content that is too low may not achieve the desired high refractive index and high dispersion. However, when the content is too high, stability of the glass is significantly lowered. Therefore, the content preferably falls within the range of 25 to 80%. A more preferable range is 25% to 70%, and a most preferable range is 25% to 60%.

The RO, $Rn_2O$ (wherein R represents one or more selected from a group consisting of Zn, Ba, Sr, Ca, and Mg; and Rn represents one or more selected from a group consisting of Li, Na, K, and Cs) components are effective in improving the melting property and stability of the glass, and in lowering the Tg. Furthermore, they play a major role in improving the transparency of the glass in the visible region; therefore, either one of these components is essential. When total content of one or two of these components (RO+$Rn_2O$) is too low, the effect is not realized, while too high a content may result in deterioration of the stability. Hence, the total content of these components is preferably from 5 to 60%. The total content falls more preferably within the range of 8 to 55%, and particularly preferably within the range of 15 to 50%. However, when RO is introduced alone, suitable content for achieving the aforementioned effect falls within the range of 5 to 50%, more preferably within the range of 10 to 40%, and most preferably within the range of 15 to 40%. Among the $Rn_2O$ components, BaO and ZnO components are the most effective; therefore, either of these is preferably included. Additionally, when one or two among SrO, CaO, and MgO is concurrently included, stability, chemical durability, and transmittance in the visible region of the glass are further improved. Therefore, it is more preferred that one or two of these components, and either one or both of BaO and ZnO be concurrently included. Moreover, when $Rn_2O$ is introduced alone, suitable content for achieving the aforementioned effect falls preferably within the range of 5 to 45%, more preferably within the range of 8 to 40%, and most preferably within the range of 10 to 40%. Of the RO components, $Li_2O$ and $Na_2O$ components best exhibit the aforementioned effect; therefore, it is preferred that either one or both of these be included. However, in order to particularly improve the chemical durability of the glass, use in combination with $K_2O$ is preferred. It is preferred that total content of $Li_2O$, $Na_2O$, and $K_2O$ components exceed 8%. The total content is more preferably 8.5% or greater, and particularly preferably 9% or greater.

Furthermore, in order to realize the aforementioned effect more efficaciously, the total content of $La_2O_3$, $ZrO_2$, $TiO_2$, SrO, $Na_2O$, and $Li_2O$ may be a predetermined value or greater expressed in oxide-based mole percentage, and thus, a synergistic action with the aforementioned effect can be expected. Therefore, the total content of $La_2O_3$, $ZrO_2$, $TiO_2$, SrO, $Na_2O$, and $Li_2O$ preferably exceeds 10%. The total content is more preferably 10.5% or greater, and particularly preferably 11% or greater.

The $Al_2O_3$, $Ga_2O_3$ components can be optionally added because they are effective in improving melting properties and chemical durability of the glass. It is particularly desired that they be introduced to substitute for $B_2O_3$ or $SiO_2$ or $GeO_2$. However, in the case of the composition containing $B_2O_3$ or $SiO_2$ or $GeO_2$ at a content exceeding 40%, introduction of these components may lead to the Tg exceeding 480° C. Therefore, these components should be introduced to a composition with the content of $B_2O_3$ or $SiO_2$ or $GeO_2$ being 40% or less, more preferably 35% or less, and particularly preferably 30% or less. When the total content of one or two of these components is low, the effect may not be exhibited, while too great a total content may result in deterioration of the melting properties and stability of the glass, and the Tg may increase to a great extent. Therefore, the total content of $Al_2O_3$ and $Ga_2O_3$ preferably falls within the range of 0 to 20%. The total content falls more preferably within the range of 0.1 to 20%, even more preferably within the range of 0.5 to 10%, and particularly preferably within the range of 0.5 to 5%.

The $P_2O_5$ component can be optionally added because it is effective in improving the melting property of the glass. When the amount is too small, the effect may not be exhibited, while too great an amount of the same may deteriorate the melting property of the glass. Therefore, the content of this component preferably falls within the range of 0 to 8%. The content falls more preferably within the range of 0.1 to 8%, even more preferably within the range of 0.5 to 5%, and particularly preferably within the range of 0.5 to 4%.

The $TiO_2$ component can be optionally added because it is effective contributing to improvement of the refractive index and chemical durability of the glass, and to attaining high dispersion. When the content is too low, the effect may not be exhibited, while too great a total content may deteriorate the melting property of the glass and the stability of the glass, and the Tg may increase to a great extent. Therefore, the content of this component preferably falls within the range of 0 to 20%. The content falls more preferably within the range of 0.1 to 20%, even more preferably within the range of 0.5 to 18%, and particularly preferably within the range of 0.5 to 15%.

The $La_2O_3$, $Y_2O_3$, $Gd_2O_3$ components can be optionally added because they are greatly effective in improving the refractive index, chemical durability and transparency of the glass, and in adjusting the dispersion. When the total content of one or two or more of these components is too low, the effect may not be exhibited, while too great a total content may result in not only deterioration of the melting property and stability of the glass, but also elevation of the Tg. Therefore, the content preferably falls within the range of 0 to 15%. The content falls more preferably within the range of 0.1 to 15%, even more preferably within the range of 0.5 to 15%, and particularly preferably within the range of 0.5 to 10%.

The $ZrO_2$, $SnO_2$, $Nb_2O_5$, $Ta_2O_5$, $WO_3$ components can be optionally added because they are effective in improving the refractive index and chemical durability of the glass. When the total content of one or two or more of these components is too low, the effect may not be exhibited, while too great a total content may result in deterioration of the melting properties and stability of the glass, and the Tg may increase to a great extent. Therefore, the content preferably falls within the range of 0 to 10%. The content falls more preferably within the range of 0.1 to 10%, even more preferably within the range of 0.5 to 8%, and particularly preferably within the range of 0.5 to 5%.

The $Sb_2O_3$ or $As_2O_3$ component can be added for defoaming the glass during melting, but the amount of up to 5% is sufficient.

It is preferred that PbO which is a component that is inappropriate for optical glasses for a mold press be not included.

The optical glass of the present invention has a refractive index ($n_d$) of 1.85 or greater, and an Abbe number ($\nu_d$) falling within the range of 10 to 30. More preferred ranges of $n_d$ and $\nu_d$ are 1.90 or greater and 10 to 25, respectively, and most preferred ranges are 1.92 or greater and 10 to 25, respectively.

In addition to high refractive index and high dispersion, the optical glass of the present invention has a transition point (Tg) of 480° C. or lower. A more preferred range of the Tg is 350 to 480° C., and the most preferred range is 360 to 460° C.

Measurement of transmittance herein was carried out in accordance with Japan Optical Glass Industrial Association Standards, JOGIS02-1975. With respect to the transparency of the optical glass of the present invention as represented by transmittance of the glass, the wavelength at which the spectral transmittance of 70% is exhibited, using a sample having a thickness of 10 mm may be 600 nm or lower, more preferably 550 nm or lower, and most preferably 530 nm or lower.

EMBODIMENTS

The optical glass of the present invention can be manufactured by the following method. More specifically, each starting material (oxide, carbonic acid salt, nitric acid salt, phosphoric acid salt, sulfuric acid salt or the like) was weighed in a given amount. After mixing homogeneously, the mixture was placed in a quartz crucible, an alumina crucible, a gold crucible, a platinum crucible, a gold or platinum alloy crucible, an iridium alloy crucible or the like, and was melted in a melting furnace at 800 to 1250° C. for 2 to 10 hrs while stirring to permit homogenization. Thereafter, the temperature was lowered to a suitable point, and casting in a mold or the like was performed to obtain a glass.

The present invention will be explained below by way of Embodiments; however, the present invention is not limited to these Embodiments.

The materials were weighed such that types of glass of 400 g having the predetermined composition shown in Tables 1 to 4 were provided. After mixing homogeneously, the mixture was melted using quartz and a platinum crucible at 900 to 1100° C. for 2 to 3 hrs. Thereafter, the temperature was lowered to 750 to 900° C., and further incubated for 40 min. The mixture was cast in a mold to manufacture glass. Characteristics of the resulting glass are shown in Tables 1 to 4. Furthermore, spectral transmittance was measured on Embodiment 1 and Embodiment 17. The results are shown in FIG. 1.

Measurement of the transmittance was carried out in accordance with Japan Optical Glass Industrial Association Standards JOGIS02. In the present invention, the transmittance, not the degree of coloring, is presented. Specifically, spectral transmittance at 200 to 800 nm on the parallel opposing face-polished product having a thickness of 10±0.1 mm was measured in accordance with JIS Z8722. The value of (wavelength at which the transmittance is 70%)/(wavelength at which the transmittance is 5%) is shown, which was determined by rounding off the values.

The transition point (Tg) was measured with a thermodilatometer at a temperature-ascending rate of 4° C./min.

For the refractive index ($n_d$) and the Abbe number ($v_d$), the glass was kept at around the transition point (Tg) for 2 hrs, then cooled at a slow temperature-descending rate of—25° C./Hr, and measured according to JOGIS01-2003.

Additionally, in a similar manner to the aforementioned Embodiments, a Comparative Example having the composition of 50 $B_2O_3$-20 $SiO_2$-30 $Bi_2O_3$ (in mole percentage) as shown in Table 4 was manufactured. The glass almost completely devitrified, and a sample which could be used for evaluation of the physical properties could not be obtained.

TABLE 1

| | Embodiments | | | | | | | | | |
|---|---|---|---|---|---|---|---|---|---|---|
| | 1 | 2 | 3 | 4 | 5 | 6 | 7 | 8 | 9 | 10 |
| $B_2O_3$ | 26 | 10 | 14 | 10 | 10 | | | 20 | 26 | 26 |
| $SiO_2$ | 10 | 20 | 20 | 20 | 15 | 30 | | 10 | 10 | 10 |
| $GeO_2$ | | | | | 5 | | 30 | | | |
| $P_2O_5$ | | | | | | | | | | |
| $Bi_2O_3$ | 30 | 30 | 26 | 30 | 30 | 30 | 30 | 30 | 30 | 30 |
| $Al_2O_3$ | | | | | | | | | 4 | |
| $Ga_2O_3$ | | | | | | | | | | 4 |
| ZnO | 10 | 10 | 10 | 10 | 10 | 10 | 10 | 10 | 10 | 10 |
| BaO | 10 | 10 | 10 | 10 | 10 | 10 | 10 | 10 | 10 | 10 |
| SrO | | | | | | | | | | |
| CaO | | 10 | 10 | 8 | 10 | 10 | 10 | | | |
| MgO | | | | 2 | | | | | | |
| $K_2O$ | | | | | | | | | | |
| $Na_2O$ | | | | | | | | | | |
| $Li_2O$ | 10 | 10 | 10 | 10 | 10 | 10 | 10 | 10 | 10 | 10 |
| $TiO_2$ | | | | | | | | 10 | | |
| $ZrO_2$ | | | | | | | | | | |
| $La_2O_3$ | 4 | | | | | | | | | |
| $Gd_2O_3$ | | | | | | | | | | |
| $Y_2O_3$ | | | | | | | | | | |
| $SnO_2$ | | | | | | | | | | |
| $WO_3$ | | | | | | | | | | |
| $Nb_2O_5$ | | | | | | | | | | |
| $Ta_2O_5$ | | | | | | | | | | |
| $Sb_2O_3$ | | | 0.05 | | | | | | 0.05 | |
| $As_2O_3$ | | | | | | | | | | 0.05 |
| Tg | 415 | 405 | 405 | 408 | 406 | 410 | 423 | 413 | 412 | 410 |
| $n_d$ | 1.968 | 1.990 | 1.953 | 1.988 | 1.993 | 2.018 | 2.038 | 2.029 | 1.946 | 1.948 |
| $v_d$ | 21.6 | 19.7 | 21.1 | 19.8 | 19.7 | 18.3 | 18.2 | 18.9 | 21.9 | 21.8 |
| $\lambda_{70\%}$ | 470 | 500 | 470 | 500 | 500 | 525 | 515 | 495 | 470 | 470 |
| $\lambda_{5\%}$ | 410 | 420 | 410 | 420 | 420 | 440 | 430 | 420 | 410 | 410 |

TABLE 2

| | Embodiments | | | | | | | | | |
|---|---|---|---|---|---|---|---|---|---|---|
| | 11 | 12 | 13 | 14 | 15 | 16 | 17 | 18 | 19 | 20 |
| $B_2O_3$ | 26 | 30 | 25 | 25 | 25 | 25 | 25 | 25 | 25 | 25 |
| $SiO_2$ | 10 | 20 | 15 | 14 | 15 | 15 | 15 | 15 | 15 | 15 |
| $GeO_2$ | | | | | | | | | | |
| $P_2O_5$ | | | | 1 | | | | | | |
| $Bi_2O_3$ | 30 | 30 | 30 | 30 | 30 | 35 | 35 | 35 | 35 | 35 |
| $Al_2O_3$ | | | | | | | | | | |
| $Ga_2O_3$ | | | | | | | | | | |
| ZnO | 10 | 10 | 20 | 20 | 20 | 10 | 5 | | | |
| BaO | 10 | 10 | 9.5 | 10 | | 5 | 10 | 10 | 10 | 10 |
| SrO | | | | | | | | 5 | 5 | |
| CaO | | | | | | | | | | |
| MgO | | | | | | | | | | |
| $K_2O$ | | | | | | | | | 10 | |
| $Na_2O$ | | | | | | | | 10 | | |
| $Li_2O$ | 10 | | | | 10 | 10 | 10 | | | 12 |
| $TiO_2$ | | | | | | | | | | |
| $ZrO_2$ | | | | | | | | | | |
| $La_2O_3$ | | | | | | | | | | |
| $Gd_2O_3$ | | | | | | | | | | 3 |
| $Y_2O_3$ | 4 | | | | | | | | | |
| $SnO_2$ | | | 0.5 | | | | | | | |
| $WO_3$ | | | | | | | | | | |
| $Nb_2O_5$ | | | | | | | | | | |
| $Ta_2O_5$ | | | | | | | | | | |
| $Sb_2O_3$ | | | | | | 0.02 | | | | |

TABLE 2-continued

| | Embodiments | | | | | | | | | |
|---|---|---|---|---|---|---|---|---|---|---|
| | 11 | 12 | 13 | 14 | 15 | 16 | 17 | 18 | 19 | 20 |
| $As_2O_3$ | | | | | 0.05 | | | | | |
| Tg | 418 | 438 | 445 | 440 | 408 | 390 | 395 | 390 | 395 | 394 |
| $n_d$ | 1.965 | 1.964 | 1.949 | 1.947 | 1.972 | 2.018 | 2.002 | 1.977 | 1.957 | 2.011 |
| $\nu_d$ | 21.7 | 21.5 | 22.0 | 22.1 | 21.1 | 19.4 | 19.8 | 19.5 | 19.4 | 19.7 |
| $\lambda_{70\%}$ | 470 | 470 | 470 | 470 | 470 | 500 | 490 | 490 | 490 | 500 |
| $\lambda_{5\%}$ | 410 | 405 | 405 | 405 | 405 | 415 | 415 | 410 | 410 | 420 |

TABLE 3

| | Embodiments | | | | | | | | | |
|---|---|---|---|---|---|---|---|---|---|---|
| | 21 | 22 | 23 | 24 | 25 | 26 | 27 | 28 | 29 | 30 |
| $B_2O_3$ | 25 | 25 | 25 | 25 | 5 | 30 | 10 | 25 | 25 | 28 |
| $SiO_2$ | 15 | 15 | 15 | 15 | 15 | | 10 | 15 | 15 | 10 |
| $GeO_2$ | | | | | | | | | | |
| $P_2O_5$ | | | | | | | | | | |
| $Bi_2O_3$ | 35 | 34 | 34 | 34 | 40 | 40 | 40 | 40 | 40 | 42 |
| $Al_2O_3$ | | | | | | | | | | |
| $Ga_2O_3$ | | | | | | | | | | |
| ZnO | | 5 | 5 | 5 | 10 | 10 | 10 | 10 | | 6 |
| BaO | 10 | 10 | 10 | 10 | 10 | 10 | 10 | | 10 | |
| SrO | | | | | | | | | | 2 |
| CaO | | | | | 10 | | 10 | | | |
| MgO | | | | | | | | | | |
| $K_2O$ | | | | | | | | | | |
| $Na_2O$ | | | | | | | | | | |
| $Li_2O$ | 12 | 10 | 10 | 10 | 10 | 10 | 10 | 10 | 10 | 10 |
| $TiO_2$ | | | | | | | | | | 2 |
| $ZrO_2$ | 3 | | | | | | | | | |
| $La_2O_3$ | | | | | | | | | | |
| $Gd_2O_3$ | | | | | | | | | | |
| $Y_2O_3$ | | | | | | | | | | |
| $SnO_2$ | | | | | | | | | | |
| $WO_3$ | | 1 | | | | | | | | |
| $Nb_2O_5$ | | | 1 | | | | | | | |
| $Ta_2O_5$ | | | | 1 | | | | | | |
| $Sb_2O_3$ | | | | | | | | | | |
| $As_2O_3$ | | | | | 0.02 | | | | | |
| Tg | 396 | 398 | 398 | 400 | 400 | 395 | 395 | 388 | 392 | 365 |
| $n_d$ | 2.008 | 1.994 | 2.003 | 1.997 | 2.059 | 2.005 | 2.037 | 2.062 | 2.032 | 2.11076 |
| $\nu_d$ | 19.6 | 20.4 | 19.8 | 20.6 | 17.5 | 19.8 | 18.3 | 18.3 | 18.9 | 16.9 |
| $\lambda_{70\%}$ | 500 | 490 | 490 | 490 | 530 | 490 | 520 | 500 | 500 | 480 |
| $\lambda_{5\%}$ | 420 | 415 | 415 | 415 | 430 | 410 | 420 | 410 | 415 | 425 |

TABLE 4

| | Embodiments | | | | | Comparative |
|---|---|---|---|---|---|---|
| | 31 | 32 | 33 | 34 | 35 | Example |
| $B_2O_3$ | 29.93 | 27 | 25 | 26 | 25 | 50 |
| $SiO_2$ | 9.97 | 10 | 10 | 15 | 15 | 20 |
| $GeO_2$ | | | | | | |
| $P_2O_5$ | | | | | | |
| $Bi_2O_3$ | 34.91 | 43 | 40 | 34 | 35 | 30 |
| $Al_2O_3$ | | | | | | |
| $Ga_2O_3$ | | | | | | |
| ZnO | 4.99 | 6.50 | 10 | 10 | 7 | |
| BaO | 6.98 | 1 | | | 3 | |
| SrO | 2.99 | 2.5 | | | | |
| CaO | | | | | | |
| MgO | | | | | | |
| $K_2O$ | | | | | | |
| $Na_2O$ | | | | | | |
| $Li_2O$ | 9.98 | 10 | 8 | 10 | 10 | |
| $TiO_2$ | | | | | | |
| $ZrO_2$ | | | 2 | 3 | 2 | |
| $La_2O_3$ | | | 2 | 3 | 3 | |
| $Gd_2O_3$ | | | 3 | | | |
| $Y_2O_3$ | | | | | | |
| $SnO_2$ | | | | | | |
| $WO_3$ | | | | | | |
| $Nb_2O_5$ | | | | | | |
| $Ta_2O_5$ | | | | | | |
| $Sb_2O_3$ | 0.25 | | | | | |
| $As_2O_3$ | | | | | | |
| Tg | 386 | 360 | 393 | 400 | 400 | Devitrification |
| $n_d$ | 2.014 | 2.101 | 2.096 | 2.036 | 20.44 | |
| $\nu_d$ | 19.4 | 17.1 | 18.1 | 19.6 | 19.2 | |
| $\lambda_{70\%}$ | 460 | 482 | 470 | 470 | 470 | |
| $\lambda_{5\%}$ | 417 | 425 | 415 | 415 | 415 | |

From Tables 1 to 4, it was elucidated that all glass of Embodiments had a $n_d$ of 1.90 or greater, a $\nu_d$ falling within the range of 10 to 25, and a Tg of 450° C. or lower. Moreover, from the spectral transmittance curve shown in FIG. 1, it is understood that the glass of the present invention has high transparency. Because the absorption edge of the glass shifts toward the lower wavelength as the thickness of the glass becomes smaller, and the transparency at the short wavelength varies depending on the thickness, in the present invention, values were obtained for wavelength at which spectral transmittances of 70% and 5% ($\lambda_{70\%}$ and $\lambda_{5\%}$) are exhibited, for a thickness of 10 mm in the present invention, and transparency of the glass was evaluated. The results are shown in Tables 1 to 3. Herein, the wavelength at which the spectral transmittance of 5% is exhibited is referred to as glass absorption edge. It was demonstrated that all glass had wavelengths that exhibit the spectral transmittance of 70%, of being 600 nm or lower, and absorption edges of 450 nm or lower, suggesting high transparency in the visible region.

Additionally, as a result of experiments with a precision mold press with these types of glass, lenses with high precision were obtained, and favorable transferability property was exhibited without adhesion of the glass to the mold.

INDUSTRIAL APPLICABILITY

As described above, the optical glass of the present invention has as an optical constant, a refractive index ($n_d$) of 1.94 or greater, and has high transparency in the visible region, having a transition point (Tg) of 480° C. or lower, and is suited for molding by a precision mold press. In addition, the optical glass can be applied to any of: a method in which a melted glass is directly molded to obtain an optical element such as a lens; and a method in which molding is performed from a melted glass via a preform mold (which can be obtained by a method of molding through obtaining a melted glass with a mold, a method of press molding, or a method of grinding, polishing) to obtain an optical element such as a lens.

Moreover, the optical glass of the present invention is suitable for lenses for optical communication, the demand for which has been rapidly increasing in recent years. A lens for optical communication is a glass lens which functions by injecting a laser beam emitted from a luminous body such as semiconductor laser into an optical fiber at a high efficiency, and is a micro-optical accessory that is necessary for members for optical communication. Although a ball lens, a nonspherical lens or the like may be used as this lens, a required characteristic therefore is a high refractive index. In particular, the optical glass of the present invention is suited for molding by precision mold press in cases in which it is used as a nonspherical lens.

The invention claimed is:

1. An optical glass, comprising:

$Bi_2O_3$ in an amount of 25 to 43%;

$B_2O_3$+$SiO_2$ in an amount of 3 to 60%;

$Li_2O$+$Na_2O$+$K_2O$ in an amount of no less than 8.5%;

$P_2O_5$ in an amount of 0 to 8%; and a content of $GeO_2$ of in an amount of 0 to 5%, expressed in oxide-based mole percentage;

wherein the optical glass has a refractive index ($n_d$) of 1.85 or greater, and an Abbe number ($\nu_d$) of 10 to 30, and wherein a wavelength at which spectral transmittance of 70% is exhibited is no more than 600 nm in a sample having a thickness of 10 mm.

2. An optical glass according to claim 1, having a transition point (Tg) of 480° C. or lower.

3. An optical glass according to claim 1, further comprising: RO+$Rn_2O$ in an amount of 8.5 to 60% (wherein R represents one or more selected from a group consisting of Zn, Ba, Sr, Ca, and Mg; and Rn represents one or more selected from a group consisting of Li, Na, K, and Cs), and $Sb_2O_3$+$As_2O_3$, wherein $Sb_2O_3$+$As_2O_3$ is present in an amount of no more than 5%, with each component in the range expressed in oxide-based mole percentage, wherein a wavelength at which a spectral transmittance of 70% is exhibited is 550 nm or lower.

4. An optical glass according to claim 1, further comprising: one or two of $Al_2O_3$ and $Ga_2O_3$ components, wherein one or two of $Al_2O_3$ and $Ga_2O_3$ components is present in an amount of no more than 20% expressed in oxide-based mole percentage.

5. An optical glass according to claim 1, further comprising: $TiO_2$, wherein $TiO_2$ is present in an amount of no more than 20% expressed in oxide-based mole percentage.

6. An optical glass according to claim 1, further comprising: one or more of $La_2O_3$, $Y_2O_3$, and $Gd_2O_3$ components, wherein one or more of $La_2O_3$, $Y_2O_3$, and $Gd_2O_3$ components is present in an amount of no more than 15% expressed in oxide-based mole percentage.

7. An optical glass according to claim 1, further comprising: one or more of $ZrO_2$, $SnO_2$, $Nb_2O_5$, $Ta_2O_5$, and $WO_3$ components, wherein one or more of $ZrO_2$, $SnO_2$, $Nb_2O_5$, $Ta_2O_5$, and $WO_3$ components is present in an amount of no more than 10% expressed in oxide-based mole percentage.

8. An optical glass according to claim 1 wherein an absorption edge is 450 nm or lower.

9. An optical glass according to claim 1, wherein a $B_2O_3$/$SiO_2$ value (mole percentage ratio), expressed in oxide-based mole percentage, is 0.2 to 5.

10. An optical glass according to claim 1 wherein total content of $La_2O_3$, $ZrO_2$, $TiO_2$, SrO, $Na_2O$, and $Li_2O$ exceeds 10% expressed in oxide-based mole percentage.

11. An optical glass for precision molding, made of an optical glass according to claim 1.

12. An optical element obtained by molding the glass for precision molding according to claim 11.

13. An optical glass according to claim 1, containing no $Ga_2O_3$ component on an oxide basis.

* * * * *